(12) United States Patent
Gottschald

(10) Patent No.: US 6,168,505 B1
(45) Date of Patent: Jan. 2, 2001

(54) POLISHING MACHINE FOR SPECTACLE LENSES

(75) Inventor: Lutz Gottschald, Meerbusch (DE)

(73) Assignee: Wernicke & Co. GmbH (DE)

(*) Notice: Under 35 U.S.C. 154(b), the term of this patent shall be extended for 0 days.

(21) Appl. No.: 09/254,607

(22) PCT Filed: Aug. 14, 1997

(86) PCT No.: PCT/EP97/04463

§ 371 Date: Apr. 12, 1999

§ 102(e) Date: Apr. 12, 1999

(87) PCT Pub. No.: WO98/09770

PCT Pub. Date: Mar. 12, 1998

(30) Foreign Application Priority Data

Sep. 4, 1996 (DE) .............................. 196 35 807

(51) Int. Cl.[7] .............. B24B 1/00; B24B 7/19; B24B 7/30; B24B 29/00

(52) U.S. Cl. .................. 451/43; 451/255; 451/256

(58) Field of Search .................... 451/242, 246, 451/255, 256, 449, 43, 5, 42

(56) References Cited

U.S. PATENT DOCUMENTS

| | | |
|---|---|---|
| 2,747,339 | 5/1956 | Schelling . |
| 3,894,361 | 7/1975 | Georgiadis et al. . |
| 4,885,875 * | 12/1989 | Soper ............................. 451/43 |
| 4,928,439 * | 5/1990 | Ramos et al. .................... 451/43 |
| 5,630,746 * | 5/1997 | Gottschald et al. ............. 451/43 |
| 5,727,987 * | 3/1998 | Gottschald ...................... 451/43 |

FOREIGN PATENT DOCUMENTS

| | | |
|---|---|---|
| 945979 | 7/1956 | (DE) . |
| 3608957 | 9/1987 | (DE) . |
| 4309101 | 9/1994 | (DE) . |
| 2553323 | 4/1985 | (FR) . |
| 2183184 | 6/1987 | (GB) . |

* cited by examiner

Primary Examiner—Rodney A. Butler
(74) Attorney, Agent, or Firm—Robert W. Becker & Associates

(57) ABSTRACT

A polishing machine for spectacle lense edges has a machine support having a guide column. A grinding wheel is seated on a grinding spindle driven by a drive, wherein the grinding wheel, the grinding spindle, and the drive are arranged on the machine support and wherein the grinding wheel has a rotational axis. A spectacle lens securing shaft having a drive and a rotational axis is provided. An upper machine part is connected to the machine support. The spectacle lens securing shaft is arranged together with the drive on the upper machine part. The spectacle lens securing shaft is movable with the upper machine part linearly up and down. The spectacle lens securing shaft is pivotable about an axis of the guide column that is spaced from the rotational axes of the grinding wheel and of the spectacle lense securing shaft and perpendicular thereto. A grinding chamber encloses grinding wheel and spectacle lens securing shaft. The grinding chamber is sealed with respect to cooling liquid thrown off the grinding wheel and has a cooling liquid drain guided to the machine support. A movable seal is positioned between the grinding chamber and the grinding spindle. It is also possible to have the grinding spindle moveable and the securing shaft stationary.

7 Claims, 2 Drawing Sheets

POLISHING MACHINE FOR SPECTACLE LENSES

BACKGROUND OF THE INVENTION

The invention relates to a polishing machine for spectacle lense edges with a driven grinding wheel, a driven spectacle lense securing shaft moveable relative to the grinding wheel in two substantially perpendicularly arranged axes, and a grinding chamber enclosing the grinding wheel and the spectacle lense securing shaft.

Polishing machines for spectacle lense edges of the aforementioned kind are known, for example, from patents 36 08 957 and 43 09 101 of the instant applicant.

The polishing machine for spectacle lense edges described in the German patent 36 08 957 is of the kind in which a grinding chamber is fastened to a machine support frame, a spectacle lense securing shaft is guided with its drive through the grinding chamber, in which also a grinding wheel is arranged which is guided in a sealed manner out of the grinding chamber and, outside of the grinding chamber, is arranged on a cross-slide rest together with its drive so that it can be moved in this manner radially as well as axis-parallel to a spectacle lense blank arranged on the spectacle lense securing shaft.

In this polishing machine for spectacle lense edges, an increased spacial requirement results from this arrangement and, moreover, the cross-slide rest guides are highly precise components which are rather expensive to manufacture and are sensitive with regard to soiling. This is also true for a polishing machine for spectacle lense edges disclosed in French patent application 2 553 323 in which only the grinding wheel and its drive motor are arranged on a carriage guide while an arm that supports the spectacle lense securing shaft and also supports the grinding chamber, in which the spectacle lense blank arranged on the spectacle lense securing shaft as well as the grinding wheel are arranged, so that it is pivotable only about a horizontal axis.

In contrast, the polishing machine for spectacle lense edges according to the German patent 43 09 101 is less complicated in its manufacture because the grinding wheel with its drive is stationarily arranged on a machine support and the spectacle lense securing shaft is arranged so as to be moveable relative thereto at a pivotable upper machine part that can be vertically reciprocated and pivoted about a vertical axis. The column guide action can be realized precisely and in a stable fashion with simple means. However, in this known polishing machine for spectacle lense edges, despite the covers provided for the grinding wheel and the spectacle lense blanks secured at the spectacle lense securing shaft there is a risk of soiling of sensitive machine parts because of the cooling liquid which is sprayed into the area between the grinding wheel and the spectacle lense blank and is thrown off the grinding wheel together with the ground off material of the spectacle lense because between the machine support comprising a depression in which the grinding wheel is arranged and the upper machine part with the spectacle lense securing shaft an unavoidable gap is present through which the cooling liquid can penetrate into the area of the guides for the upper machine part.

It is a partial object of the invention to design a polishing machine for spectacle lense edges similar to that of German patent 43 09 101 such that with a simple construction it provides at least the same protection against splashing cooling liquid as the polishing machine for spectacle lense edges according to the German patent 36 08 957. A further partial object of the invention is to provide suitable drives for the lifting and lowering movement as well as the pivot movement that are suitable for a CNC control in conjunction with a polishing machine for spectacle lense edges of a kind similar to the kind disclosed in the aforementioned patent. Finally, the invention has a further partial object in that for a polishing machine for spectacle lense edges similar to the kind disclosed in the aforementioned patent an advantageous arrangement of a device for controlling the grinding process is to be suggested.

SUMMARY OF THE INVENTION

As a solution to the first partial object, a polishing machine for spectacle lense edges is suggested having a grinding wheel which is arranged together with its drive on a machine support supporting a guide column, further having a spectacle lense securing shaft arranged with its drive on the upper machine part so as to be linearly moveable up and down as well as pivotable about an axis of the guide column which is perpendicular to and spaced from the grinding wheel and spectacle lense securing shaft axis, further having a grinding chamber surrounding the grinding wheel and the spectacle lense securing shaft that seals against the cooling liquid which is thrown off the grinding wheel, whereby the grinding chamber is arranged at the upper machine part and has a cooling liquid drain guided into the machine support, and having a moveable seal between the grinding chamber and a grinding spindle.

Since this grinding chamber sealingly surrounds the spectacle lense securing shaft as well as the grinding wheel, the cooling liquid which is thrown off the grinding wheel cannot enter the area of drives and guides whereby, however, the spectacle lense securing shaft is easily accessible from the exterior via a pivotable lid at the grinding chamber and whereby the grinding process can be easily observed through the pivot cover when it is transparent.

In this embodiment, the guide column thus provides a linear guiding action for the up and down movement of the upper machine part as well as a pivot guiding action about the axis of the guide column. By arranging the grinding chamber, which tightly encloses the spectacle lense securing shaft and the grinding wheel at the upper machine part, the cooling liquid which is thrown off the grinding wheel is safely kept away from contacting the column guide and the drive for the grinding wheel.

In another embodiment, the grinding chamber and the spectacle lense securing shaft with its drive can be arranged above the grinding wheel and its drive at a machine support, while the grinding wheel and its drive are arranged on a pivotable arm which is moveably supported at a vertical guide column so as to move up and down and to pivot about the axis of the guide column whereby its grinding spindle is guided sealingly in the grinding chamber.

In this embodiment, the grinding chamber is thus also fastened at the upper machine part and surrounds the spectacle lense securing shaft and the grinding wheel. The grinding wheel in this case performs the relative movement to the spectacle lense securing shaft and to the spectacle lense blank clamped thereat without requiring any changes in regard to the seals and the effectiveness of the seals relative to the drives and the guides.

The sealing action between the grinding spindle and the grinding chamber can be realized in the two embodiments by a simple bellows which allows sufficient movability for the relative movements between the grinding chamber and the grinding spindle.

In order to be able to remove the grinding dust from the grinding chamber, it is possible to orient a cooling liquid stream into the area between the spectacle lense blank and the surface of the grinding wheel which, for example, consists of fresh water or cooling water which is recirculated and filtered. In both cases it is advantageous to provide in the lower area of the grinding chamber a cooling liquid drain extending into the machine support which extends into a funnel-shaped collecting receptacle at the machine support from where the collected cooling liquid flows into a collecting tank. Optionally, the liquid drain can also be sealed relative to the machine support whereby this seal is also comprised of a bellows. When the cooling liquid is fresh water, the cooling liquid draining from the cooling liquid drain is guided into a separator for removing the grinding dust and is then introduced into the waste water system. When the cooling liquid is recirculated, the cooling liquid is taken up by a cooling liquid pump downstream of the separator and is recirculated into the jets.

The grinding chamber can be embodied substantially in a parallelepipedal shape with a front wall, a back wall, two sidewalls with sealed penetrations for the spectacle lense securing shaft and the grinding spindle, a top wall with a pivot cover, a bottom with the cooling liquid drain, and an inlet for the cooling liquid in the upper area of the back wall for a large surface area wetting of the back wall in the form of a water film at least in the area of the width of the grinding wheel so that during grinding of plastic spectacle lense no clumps of grinding dust will form at the back wall which could disturb the grinding process and which are difficult to remove.

In order to facilitate exchange of the grinding wheels, the grinding chamber can have in a sidewall, which is opposite the sidewall with the penetration for the grinding spindle, a closable opening having a diameter that is larger than the diameter of the grinding wheel.

As a solution to the second partial object, a polishing machine for spectacle lense edges with CNC control is suggested having a guide column arranged at the machine support, having a spectacle lense securing shaft arranged at the upper machine part and moveable up and down with its drive on the guide column and pivotable about the axis of the guide column or having a grinding wheel which with its drive can be moved up and down at the guide column and can be pivoted about the axis of the guide column, further having a support column, which is moveable up and down within the guide column and is rotatably guided therein, for the upper machine part or the arm, further having a drive which is arranged coaxially in the guide column and engages the support column for the height adjustment of the support column, and having a drive for pivoting the support column about the axis of the guide column. This machine can be especially favorably combined with a grinding chamber surrounding the grinding wheel and the spectacle lens securing shaft.

Guiding of the support column in a play-reduced and a friction-reduced manner in an up and down movement and a pivot movement, a ball sleeve can be provided in the guide column.

More specifically, the up and down movement of the support column can be realized by a threaded spindle guided in radial and axial roller bearings and engaging via a rotationally fixed but axially slidable threaded bushing arranged in the guide column whereby the threaded spindle is rotated by a step motor and whereby a further axial roller bearing may be arranged between the threaded sleeve and the support column.

The drive for pivoting the support column can be comprised of a step motor, which drives rotatingly the threaded spindle and is arranged within the upper machine part, as well as a threaded nut that cooperates with the threaded spindle whereby the threaded nut is vertically displaceable relative to the guide column by a guide rod which is arranged in the guide column.

When a dc motor is used as the step motor, the position of the threaded spindle within the threaded sleeve can be detected by a travel sensor which is connected to the threaded sleeve and the guide column and which controls the step motor according to a preset shape of the spectacle lense via the CNC control.

The travel sensor can be designed such that the threaded sleeve is secured against rotation by a radial pin, which is guided in an axial slot and serves as a support for an encoder, and that a toothed rod which is arranged at the guide column cooperates with a gear wheel at the encoder for detecting the travel of the threaded sleeve.

As a solution of the third partial object a polishing machine for spectacle lense edges is suggested having a guide column supported at the machine support so as to be pivotable about a horizontal axis in the area of the machine support, further having a support column moveable up and down within the guide column and rotatably guided therein, further having an upper machine part fastened to the support column, further having a spectacle lense securing shaft arranged with its drive in the upper machine part, further having a grinding wheel arranged with its drive in the machine support, and a switching contact arranged at the upper area of the guide column, which opens and closes when the spectacle lens secured at the spectacle lens securing shaft rests at a predetermined pressure on the grinding wheel. This arrangement can be used advantageously in connection with a grinding chamber enclosing the grinding wheel and the spectacle lens securing shaft and/or a drive that is CNC-controlled for height-adjustment of the support column and a drive for pivoting the support column about the axis of the guide column, whereby the switching contact serves to effect a step-wise rotation of the spectacle lens securing shaft with the spectacle lens secured thereat, when the spectacle lense rests with a preset pressure on the grinding wheel, and to end the grinding process when the spectacle lense securing shaft with the clamped-in spectacle lens has completed one revolution at this preset pressure on the grinding wheel.

More specifically, it is advantageous when a bearing providing the horizontal pivot axis is positioned at a spacing to the vertical axis of the guide column and parallel to the axis of the grinding wheel at a console of the guide column, whereby diametrically opposed a further console is arranged at the guide column which cooperates by a spring-elastic support with the machine support, whereby this spring-elastic support can be provided in the form of an adjusting screw which is supported by a spring at the machine support and is threaded into the console. The switching contact provided at the upper end of the guide column can be comprised of a radially projecting, adjustable switching plunger and a cooperating radially arranged switch which is preferably embodied as a proximity switch.

The spring-elastic support as well as the radially adjustable switching plunger in connection with a proximity switch can be adjusted such that the switching process can be very precisely triggered within a magnitude of 0.01 to 0.05 mm and a support force of equal or less than 20 N.

For all of the aforementioned polishing machines for spectacle lense edges with guide columns it is possible in a simple manner to provide a pre grinding wheel which is suitable for grinding silicate spectacle lense as well as plastic spectacle lense on either side of the fine grinding wheel with a bevel groove, whereby the fine grinding wheel with the bevel groove is arranged such that the axis of the spectacle lense securing shaft during grinding of the V-shaped bevel of a spectacle lens is positioned at a central location substantially parallel to the axis of the grinding wheel and only a minimal pivoting during grinding of the V-shaped bevel of a spectacle lense according the spacial curve of the circumference of the spectacle lense about the vertical axis of the guide column is performed. In this manner grinding errors during fine grinding are prevented. In contrast thereto, for shaping the spectacle lense, it pivots during pre-grinding laterally onto the pre grinding wheel for pre-grinding silicate spectacle lense or to the other side onto the pre-grinding wheel for grinding plastic spectacle lense and is reciprocated during pre-grinding across the width of the pre-grinding wheel in order to achieve a uniform use of the pre-grinding wheel. Minimal grinding errors which occur during grinding at this pivoted position are compensated during the subsequent fine grinding step on the centrally arranged fine grinding wheel.

BRIEF DESCRIPTION OF THE DRAWINGS

The invention will be explained in more detail in the following with the aid of the embodiment represented in the drawing. The drawing shows in.

DESCRIPTION OF PREFERRED EMBODIMENTS

Figure 1:
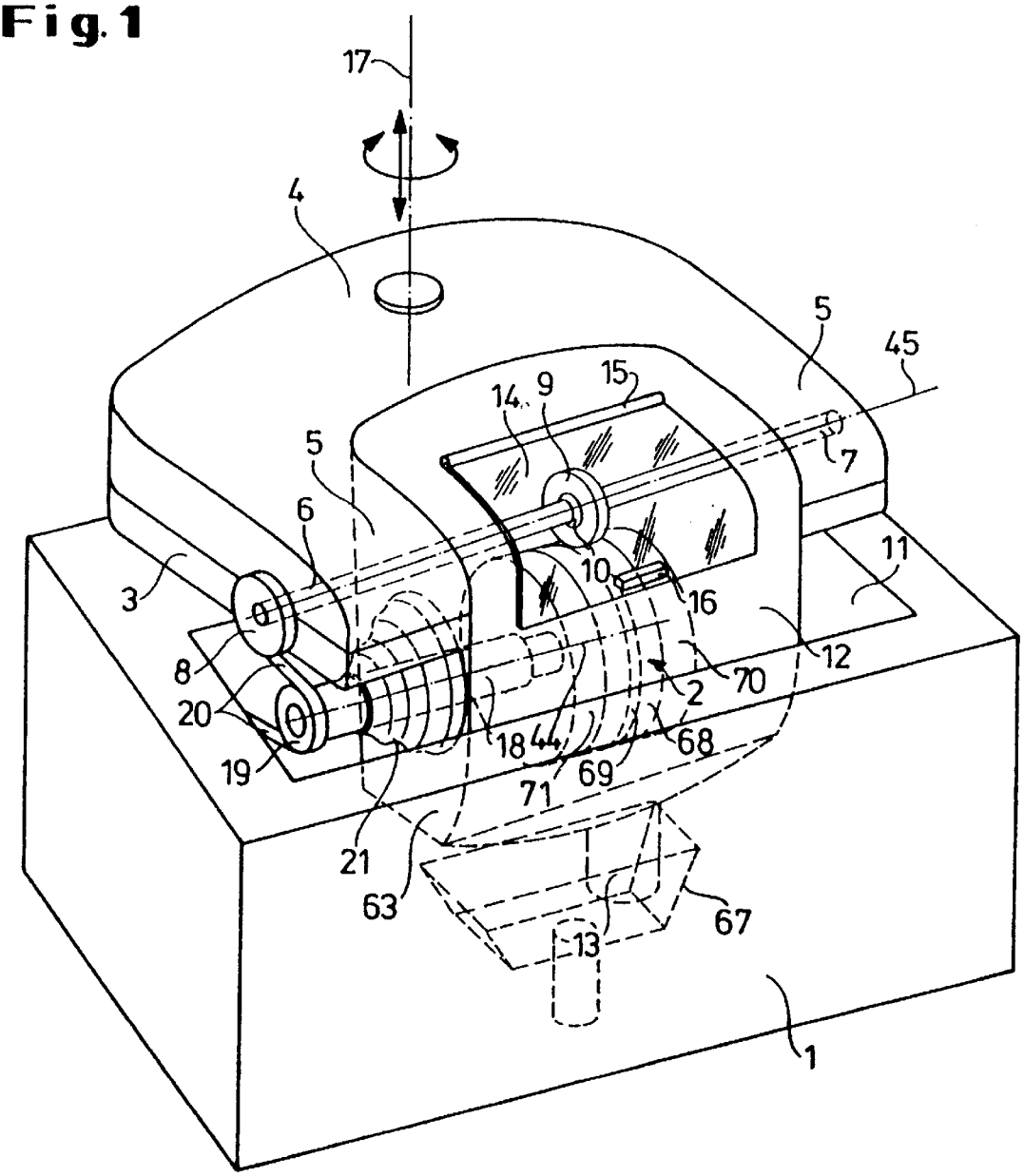
FIG. 1 a perspective view of the inventive spectacle lense edge polishing machine without sealing of the cooling liquid drain.

A polishing machine for spectacle lense edges is schematically and perspectively shown in FIG. 1 illustrating the machine support 1 which contains the entire mechanical and electrical devices for performing the grinding process and for controlling it. A grinding wheel package 2, comprised of a central fine grinding wheel 68 with a bevel groove 69 and pregrinding wheels 70, 71 arranged on either side, whereby one pregrinding wheel is used for pregrinding silicate spectacle lense and the other is used for pregrinding plastic spectacle lense, is supported with a grinding spindle 18 in the machine support 1 and is driven in fast rotation by the electric motor 22 via drive belts 20 and a pulley 19. The bevel groove 69 of the fine grinding wheel 68b is aligned with an axis 17 of a guide column 26 for an upper machine part 3 such that an axis 45 of a spectacle lens securing shaft 6, 7 during grinding of the V-shaped bevel of a spectacle lens 9 is positioned in a central position substantially parallel to an axis 44 of the grinding wheel package 2. The upper machine part 3 is supported so as to be pivotable about the vertical axis 17 and so as to be movable up and down. A housing 4 of the upper machine part covers the upper machine part 3 and its lateral arms 5. In the lateral arms 5 a semi-shaft 6 and a semi-shaft 7 are coaxially supported and can be slowly rotated by drives 23, 24 represented in FIG. 2. The semi-shafts 6, 7 serve for a clamping a spectacle lens blank 9 with blocks or suction cups 10 so that the spectacle lens blank 9 is thus readied for performing the circumferential shape grinding action. The semi-shafts 6, 7 thus form the spectacle lens securing shaft for the spectacle lens blank 9.

Figure 2:
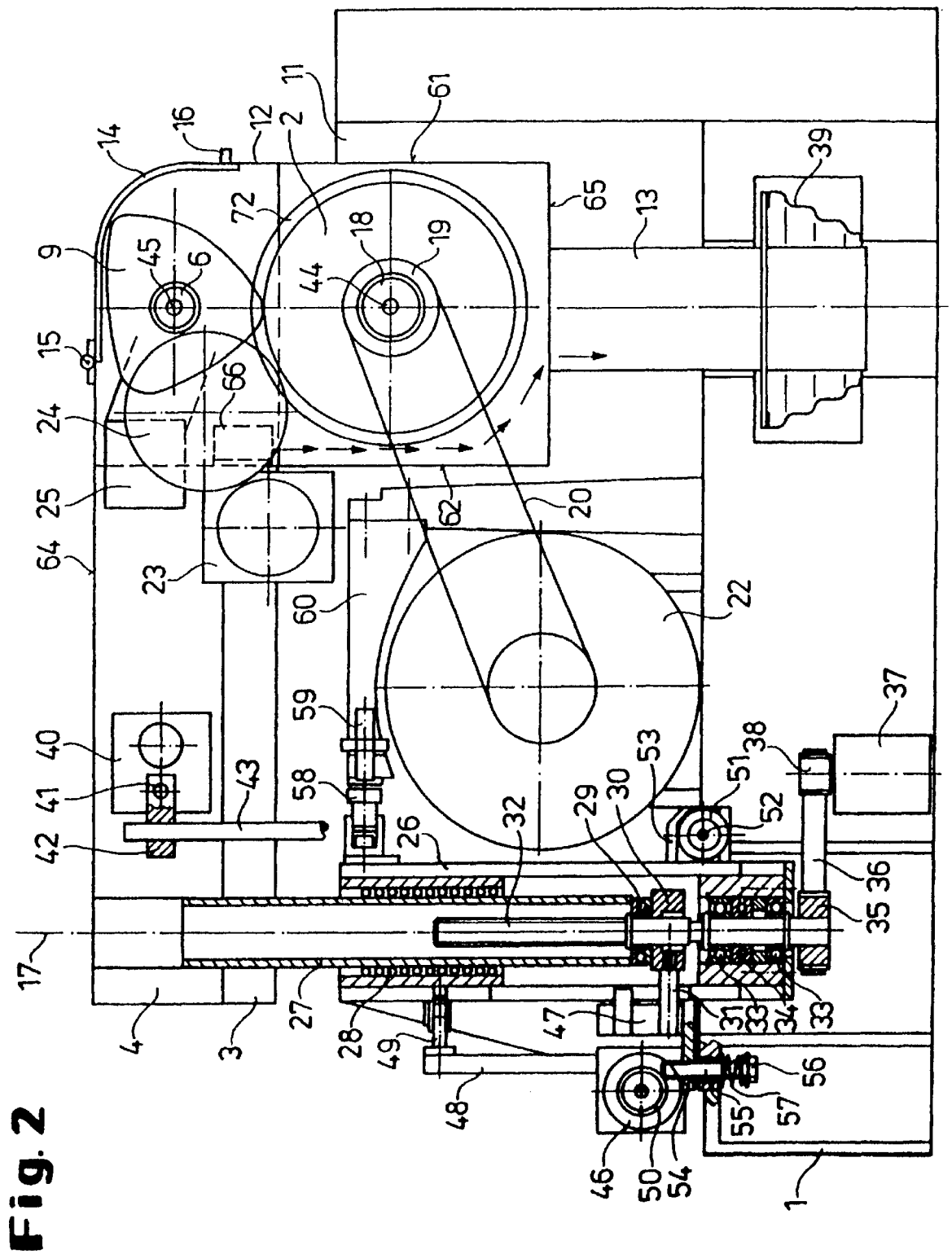
FIG. 2 a schematic sectional view of the inventive spectacle lense edge polishing machine with sealing of the cooling liquid drain.

In order to clamp the spectacle lens blank 9, one of the semi-shafts 6 is axially moved, for example, by an actuator button 8. Also, it is possible, as shown in FIG. 2, to provide for the axial movement of the semi shaft 6 a control drive 25.

Between the arms 5 of the upper machine part 3 a grinding chamber 12 is arranged which surrounds the area of the semi-shafts 6, 7 between the arms 5 and of the grinding wheel package 2. The grinding chamber is substantially of a parallelepipedal design with a front wall 61, a back wall 62, two sidewalls 63 with sealed penetrations for the semi-shafts 6, 7 and the grinding spindle 18, top wall 64 with a pivotable cover 14, and a bottom 65. A cooling liquid drain 13 provided at the lower part of the grinding chamber 12 penetrates into a funnel-shaped collecting receptacle 67 in the machine support 1 from where the cooling liquid flows into a non-represented collecting tank for further recycling.

Between the grinding spindle 18 and a sidewall 63 of the grinding chamber 12, through which the grinding spindle 18 is guided, a bellows 21 is arranged which is tightly connected to the sidewall 63 of the grinding chamber 12 and the grinding spindle 18, but provides sufficient movement play for the grinding chamber 12 relative to the grinding spindle 18 in the direction of the pivot axis 17 and about this pivot axis 17. In the sidewall 63 opposite this sidewall 63 a closable opening 72 having a diameter that is greater than the diameter of the grinding wheels 68, 70, 71 is arranged for exchanging the grinding wheels 68, 70, 71.

The grinding chamber 12 is closed by a transparent pivot cover 14 which is fastened to the top wall 64 of the grinding chamber 12 by a hinge 15 and can be pivoted upwardly into an open position by gripping the grip 16.

FIG. 2 shows the drive motor 22, fastened to the machine support 1, for driving the grinding wheel 2 and the drive motor 23, arranged at the upper machine part 3, for driving the spectacle lens securing shaft 6, 7 by interposed gear wheels 24. The drive 25 for the axial movement of the semi shaft 6 is also arranged in the upper machine part 3.

A vertical, tubular guide column 26 is fastened to the machine support 1 and serves as a guide for the support column 27 fastened to the upper machine part 3 which is guided in the vertical column 26 by a spherical sleeve 28 in a practically play-free manner.

The lower end of the support column 27 rests on an axial roller bearing 29 and can thus be rotated and axially moved substantially without friction within the ball sleeve.

The axial movement of the support column 27 is effected by a threaded spindle 32 which is threaded into a threaded sleeve 30 below the axial bearing 29. The threaded sleeve 30 is secured against rotation by a pin 31 which is guided in an axial slot 47 against rotation relative to the vertical column 26. The threaded spindle 32 is supported by parallel radial bearings 33 in the vertical column 26 while a further axial bearing 34 receives the load of the upper machine part 3 and all components arranged thereat.

The threaded spindle 32 is rotated by a height adjusting drive embodied as a step motor 37 via a pulley 38, a toothed belt 36, and a pulley 35. The step motor 37 is supplied by a non-represented CNC control and moves the upper machine part 3 and thus the spectacle lens securing shaft 6, 7 with the clamped spectacle lens 9 up and down according to the desired spectacle lens contour.

When the step motor 37 is a dc motor, the vertical position of the threaded sleeve 30 and thus of the spectacle lens 9 relative to the grinding wheel package 2 is detected by a travel sensor which comprises an encoder 46 fastened to the pin 31 and a toothed rod 48 connected to the guide column 26 by a holder 48, whereby a gear wheel 50 engages the encoder 46.

For the controlled pivot action about the vertical axis 17, a pivot drive in the form of a step motor 40 is provided in the upper machine part 3. This step motor 40 drives a threaded spindle 41 which acts on a threaded nut 42. This threaded nut 42 surrounds a guide rod 43 fastened to the vertical column 26 so that a movement of the threaded nut 42 on the threaded spindle 41, caused by the rotation of the threaded spindle 41, has the effect of pivoting the upper machine part 3 about the vertical axis 17. This vertical axis 17 is spaced relative to the horizontal rotational axis 44, 45 of the grinding wheel 2 and the spectacle lens securing shaft 6, 7. The guide rod 43 can also be fastened to the threaded nut 42 and can be moved in a guide at the guide column 26.

Pivoting about the vertical axis 17 has the effect that the spectacle lens blank 9 can be reciprocated across the width of the grinding wheel 2. This uniform reciprocating movement serves, on the one hand, to provide a uniform use of the cylindrical pregrinding wheels 70, 71. On the other hand, this controlled movement can be used to move the spectacle lens blank 9 after completion of pregrinding into the bevel groove 69 of the fine grinding wheel 68 and to grind a V-shaped bevel on the shaped spectacle lens 9.

This bevel grinding step can be performed as a free grinding step when the shaped spectacle lens can be submerged over its entire width into the groove so that the circumferential contour of the shaped spectacle lens determines the course of the V-shaped bevel.

It is also possible during grinding of the V-shaped bevel to perform a control of the pivot movement about the axis 17 by a pivot drive 40, 41, 42, 43 so that the V-shaped bevel will be provided with a preset contour on the circumference of the pre-ground spectacle lens.

For controlling the rotational movement of the spectacle lens securing shaft 6, 7 during the grinding process and for determining the end of the grinding process, a switching contact 58, 59 which opens or closes when the pressure of the spectacle lens 9, clamped in the spectacle lens securing shaft 6, 7, acting on one of the grinding wheels 68, 70, 71 falls below a predetermined pressure of, for example, 20 N.

For this purpose, the guide column 26 is pivotably supported at the machine support, on a bearing 51 positioned laterally in a console 53 at the lower end of the guide column 26 so as to be pivotable about an axis 52. The pivot axis 52 extends parallel to the axis of rotation 54 of the grinding wheel package 2. A further console 54 is arranged diametrically opposed to the bearing 51 at the guide column 26 into which the screw 55 with hexagon head 56 guided through a bore in the machine support 1 can be threaded to a greater or lesser extent. Between the hexagon head 56 and the machine support 1 a pressure spring 57 is arranged. At the upper end of the guide column 26 a switching plunger 58 is arranged which extends radially to the grinding wheel package 2 and which is adjustable. It cooperates with a proximity switch 59 arranged at a support 60.

When a spectacle lens 9 to be ground is placed onto one of the grinding wheels 68, 70, 71, the upper machine part 3 will slightly pivot about the pivot axis 52, the switching plunger 58 will be removed from the proximity switch 59, and the spectacle lens securing shaft 6, 7 with the clamped spectacle lens 9 does not rotate during the grinding process until a vertical position of the spectacle lens securing shaft 6, 7 relative to the corresponding grinding wheel is reached that has been adjusted by the threaded sleeve 30. Accordingly, the pressure force of the spectacle lens 9 onto the respective grinding wheel will decrease to a preset value of, for example, 20 N, the upper machine part will pivot about the pivot axis 52 counter to the adjustable force of the spring 57, the proximity switch 49 is activated by the approach of the switching plunger 58 and causes, by sending a signal to the CNC control, a further rotation of the spectacle lens securing shaft 6, 7 with the spectacle lens 9 so that a further pivoting of the upper machine part 3 in the opposite direction and a corresponding deactivation of the proximity switch 59 will result until in this angular position of the spectacle lens securing shaft 6, 7 the preset value will again be reached. In this manner, the step-wise rotation of the spectacle lens securing shaft 6, 7 results in the shape grinding action of the spectacle lens 9. This shape grinding action is completed when the proximity switch 59 has been activated for a complete revolution of the spectacle lens securing shaft 45 with clamped spectacle lens 9 which is a sign for completion of the grinding process so that the spectacle lens 9, when, for example, the pregrinding action has been performed in this manner, is then moved into the groove 69 of the fine grinding wheel 68 and the same process is repeated. By adjusting the pretension of the spring 57 with the adjusting screw 55 and adjusting the spacing of the switching plunger 58 from the proximity switch 59, the grinding action of the spectacle lense can be controlled in a sensitive and highly precise manner.

During grinding, a cooling liquid is sprayed from non-represented nozzles into the area between the spectacle lens blank 9 and the surface of the grinding wheel, whereby the cooling liquid also serves to remove the grinding dust. A further cooling liquid inlet 66 is provided at the back wall 62 of the grinding chamber 12 and provides for a large surface area wetting in the form of a water film of the back wall 62 at least so as to match the width of the grinding wheel package 2. This causes the grinding dust resulting from the grinding process of plastic spectacle lense to be washed away and this prevents the formation of clumps which would disturb the grinding process and which are difficult to remove. Since the grinding chamber 12 is sealed on all sides with the exception of the drain pipe 13, neither cooling liquid nor grinding dust can exit during the grinding process from the grinding chamber and cannot reach the area of the control and drives in the upper machine part 3 and the machine support 1. The cooling liquid is guided via the drain 13, which in the embodiment according to FIG. 2 is sealed by a bellows 39 relative to the support 1, to a non-represented separator where the grinding dust is removed from the cooling liquid. When fresh water is supplied as cooling water to the aforementioned jets, the cooling water from which the grinding dust has been removed can be directly guided into the waste water system. However, it is also possible to use the cooling liquid with recirculation, whereby a recirculating pump is provided which supplies the cleaned cooling liquid after separation to the jets. In this case there is no problem to provide the cooling liquid with additives, for example, corrosion-preventing and foam-preventing additives.

Instead of arranging the upper machine part 3, together with the spectacle lens securing shaft 6, 7 and all drives as well as the grinding chamber 12, so as to be liftable and lowerable as well as pivotable, it is also possible to support the upper machine part 3 at the machine support 1 and to arrange the grinding wheel package 2 with the grinding spindle 18 and the drive motor 22 at one arm so as to be liftable and lowerable in the direction of the vertical axis 17 and to be pivotable about this vertical axis 17. The drives for the lifting and lowering movement as well as for the pivot movement can be designed in analogy to the corresponding drives for the moveable upper machine part 3. The moveable penetration of the grinding spindle 18 through a sidewall 63 of the grinding chamber 12 and its sealing action by a bellows 21 can also be designed in an analogous manner. In this arrangement, a moveable penetration of the drain 13 through the machine support 1 is not required so that a simplified seal, in comparison to the one represented in FIG. 2 in the form of a bellows 39, is possible.

Optionally, the upper machine part 3 with the housing 4 can be arranged in a non-represent hood which can also receive the CNC control for the spectacle lens polishing machine and may have a monitor positioned at the front wall and a keyboard for entering data and commands.

The inventive polishing machine for spectacle lense edges is characterized by a simple column guide for the upper machine part or the grinding wheel with drive whereby the column guide as well as the drives are protected by the grinding chamber enclosing the spectacle lens securing shaft 6, 7 and the grinding wheel 2 with respect to cooling liquid that is thrown off the rotating grinding wheel 2, and the machine is thus not soiled by grinding dust. The drives for height adjustment and pivoting of the support column 27 can be integrated in a space-saving and functional manner in the same manner as the switching contacts 58, 59 so that an increased functional safety and precision can be ensured for machining of the spectacle lense. Despite these advantages, the inventive machine is simple and robust and can be produced inexpensively.

The specification incorporates by reference the entire disclosure of German priority document 196 35 807.8 of Sep. 4, 1996, and of international application PCT/EP/04463 of Aug. 14, 1997.

The present invention is, of course, in no way restricted to the specific disclosure of the specification and drawings, but also encompasses any modifications within the scope of the appended claims.

What is claimed is:

1. Polishing machine for spectacle lense edges, said polishing machine comprising:
   a machine support (1) having a guide column (26);
   a grinding wheel (2) seated on a grinding spindle (18) driven by a drive (22), wherein said grinding wheel (2), said grinding spindle (18), and said drive (22) are arranged on said machine support (1) and wherein said grinding wheel (2) has a rotational axis (44);
   a spectacle lens securing shaft (6, 7) having a drive (23, 24) and a rotational axis (45);
   a movable upper machine part (3) connected to said machine support (1);
   wherein said spectacle lens securing shaft (6, 7) is arranged together with said drive (23, 24) on said upper machine part (3);
   wherein said spectacle lens securing shaft (6, 7) is movable with said upper machine part (3) linearly up and down;
   wherein said spectacle lens securing shaft (6, 7) is pivotable about an axis (17) of said guide column (26) that is spaced from said rotational axes (44, 45) of said grinding wheel (2) and of said spectacle lense securing shaft (6, 7) and perpendicular thereto,
   a grinding chamber (12) enclosing said grinding wheel (2) and said spectacle lens securing shaft (6, 7);
   wherein said grinding chamber (12) is sealed with respect to cooling liquid thrown off said grinding wheel (2) and has a cooling liquid drain (13) guided to said machine support (1), and
   a movable seal (21) between said grinding chamber (12) and said grinding spindle (18).

2. Polishing machine according to claim 1, wherein said seal between said grinding spindle (18) and said grinding chamber (12) is embodied as a bellows (21).

3. Polishing machine according to claim 1, further comprising a seal between said grinding chamber (12) and said machine support (1), wherein said seal is a bellows (39).

4. Polishing machine according to claim 1, wherein said cooling liquid drain (13) is tubular and extends into a funnel-shaped collecting receptacle (67) at said machine support (1), wherein the cooling liquid flows from said collecting receptacle (67) into a collecting tank.

5. Polishing machine according to claim 1, wherein said grinding chamber (12) is substantially parallelepipedal and has a front wall (61), a back wall (62), two sidewalls (63) with sealed penetrations for said spectacle lens securing shaft (6, 7) and said grinding spindle (18), a top wall (64) having a pivotable cover (14), a bottom (65) in which said cooling liquid drain (13) is positioned, and a cooling liquid inlet (66) at an upper area of said back wall (62) for wetting said back wall (62) with a large surface area water film at least in the area of a width of said grinding wheel (2).

6. Polishing machine according to claim 1, further comprising:
   a fine grinding wheel (68) with a bevel groove (69) which is arranged such that an axis (54) of said spectacle lens securing shaft (6, 7) during grinding of a V-shaped bevel of a spectacle lens (8) is positioned in a central position substantially parallel to said axis (44) of said grinding wheel (2); and
   pregrinding wheels (70, 71) positioned on opposed sides of said fine grinding wheel (68), wherein one of said pregrinding wheels is designed for pregrinding silicate spectacles lense and the other is designed for pregrinding plastic spectacle lense.

7. Polishing machine according to claim 5, wherein one of said sidewalls (63) has a closeable opening (72) for exchanging said grinding wheel (2), wherein said one sidewall (63) is opposite said sidewall having said penetration for said grinding spindle (1), wherein said opening (72) has a diameter that is greater than a diameter of said grinding wheel (2).

* * * * *